(12) United States Patent
Wu et al.

(10) Patent No.: US 10,627,671 B2
(45) Date of Patent: Apr. 21, 2020

(54) ARRAY SUBSTRATE AND MANUFACTURING METHOD THEREOF, REFLECTIVE LIQUID CRYSTAL DISPLAY

(71) Applicants: Beijing BOE Optoelectronics Technology Co., Ltd., Beijing (CN); BOE Technology Group Co., Ltd., Beijing (CN)

(72) Inventors: Xiaojuan Wu, Beijing (CN); Hongliang Yuan, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 1 day.

(21) Appl. No.: 16/076,517

(22) PCT Filed: Feb. 12, 2018

(86) PCT No.: PCT/CN2018/076385
§ 371 (c)(1),
(2) Date: Aug. 8, 2018

(87) PCT Pub. No.: WO2019/007073
PCT Pub. Date: Jan. 10, 2019

(65) Prior Publication Data
US 2019/0331962 A1    Oct. 31, 2019

(30) Foreign Application Priority Data

Jul. 6, 2017  (CN) .......................... 2017 1 0545860

(51) Int. Cl.
*G02F 1/1335*  (2006.01)
*G02F 1/1343*  (2006.01)

(52) U.S. Cl.
CPC .... *G02F 1/133553* (2013.01); *G02F 1/13439* (2013.01); *G02F 1/133514* (2013.01); *G02F 2201/123* (2013.01)

(58) Field of Classification Search
None
See application file for complete search history.

(56) References Cited

U.S. PATENT DOCUMENTS 6,133,976 A  * 10/2000  Kimura ............. G02F 1/133553
                                                    349/110
6,166,792 A  * 12/2000  Miyawaki ......... G02F 1/136277
                                                    349/113
(Continued)

FOREIGN PATENT DOCUMENTS

CN      102566133      7/2012
CN      104035226      9/2014
(Continued)

OTHER PUBLICATIONS

Written Opinion of the International Searching Authority with English language translation corresponding to International Patent Application No. PCT/CN2018/076385 dated Apr. 28, 2018. (7 pages).

(Continued)

*Primary Examiner* — Ryan Crockett
(74) *Attorney, Agent, or Firm* — Myers Bigel, P.A.

(57) ABSTRACT

An array substrate, a reflective liquid crystal display and a manufacturing method for an array substrate are provided, so as to enhance the overall reflectance of the reflective liquid crystal display and improve the display contrast and quality of image displayed. The array substrate includes a base substrate, a reflective pixel electrodes array on the base substrate, and an auxiliary reflector at least including a plurality of first reflective strip elements, each first reflective (Continued)

strip element being located between two adjacent reflective pixel electrodes.

15 Claims, 3 Drawing Sheets

(56) References Cited

U.S. PATENT DOCUMENTS

| | | | | |
|---|---|---|---|---|
| 6,233,033 | B1* | 5/2001 | Moore | G02F 1/134336 349/139 |
| 6,356,327 | B1* | 3/2002 | Moore | G02F 1/136209 349/139 |
| 6,577,362 | B1* | 6/2003 | Moore | G02F 1/133553 349/113 |
| 7,551,247 | B2* | 6/2009 | Fujiwara | G02F 1/133553 349/113 |
| 2007/0064182 | A1* | 3/2007 | Lin | G02F 1/133555 349/114 |
| 2013/0242228 | A1 | 9/2013 | Park et al. | |
| 2014/0009731 | A1* | 1/2014 | O'Callaghan | G02F 1/133553 349/114 |
| 2014/0253857 | A1* | 9/2014 | Li | G02F 1/1362 349/143 |

FOREIGN PATENT DOCUMENTS

| | | |
|---|---|---|
| CN | 105974652 | 9/2016 |
| CN | 107102487 | 8/2017 |
| EP | 0837354 B1 | 7/2003 |

OTHER PUBLICATIONS

International Search report of the International Searching Authority with English language translation corresponding to International Patent Application No. PCT/CN2018/076385 dated Apr. 28, 2018. (9 pages).

First Office Action and English language translation, CN Application No. 201710545860.7, dated Jun. 11, 2019, 15 pp.

* cited by examiner

ARRAY SUBSTRATE AND MANUFACTURING METHOD THEREOF, REFLECTIVE LIQUID CRYSTAL DISPLAY

CROSS REFERENCE TO RELATED APPLICATIONS

The present application is a 35 U.S.C. 371 national stage application of PCT International Application No. PCT/CN2018/076385, filed on Feb. 12, 2018, which claims the priority of Chinese patent application No. 201710545860.7 filed on Jul. 6, 2017, the disclosures of which are hereby incorporated in their entireties by reference.

TECHNICAL FIELD

This disclosure relates to the field of display technology, in particular to an array substrate, a reflective liquid crystal display, and a manufacturing method of the array substrate.

BACKGROUND

In recent years, reflective liquid crystal displays have been widely used and developed. In addition, usage of electronic tags is becoming more and more popular, but traditional electronic tags of electronic ink can only display black and white or a few colors. Reflective liquid crystal displays are more and more widely used due to their advantages such as low power consumption, rich color, high resolution, etc. A total reflection liquid crystal display has no backlight, so it has a low reflectance, i.e., a low brightness, which may affect the quality of image displayed. The reflectance of the total reflection liquid crystal display is depended on a reflectance of a surface of the liquid crystal display, a transmittance of a polarizer, a transmittance of a color film, luminous efficiency of liquid crystals, aperture ratio of pixels, and a reflectance of a reflecting layer.

SUMMARY

Inventors recognize that, a reflecting layer of a reflective liquid crystal display is typically arranged on an array substrate and serves as pixel electrodes. Each of the pixel electrodes is controlled independently by a thin film transistor, thereby realizing display. Therefore, the reflecting layer on the array substrate cannot be a complete layer entirely covering the array substrate. Instead, it is required to be designed as a plurality of pixel electrodes in an array, which would decrease an overall intensity of the reflected light.

In view of this, embodiments of the disclosure provide an array substrate, a reflective liquid crystal display, and a manufacturing method of the array substrate, so as to enhance the overall reflectance of the reflective liquid crystal display and improve the display contrast and quality of image displayed.

According to an aspect, an array substrate is provided by an embodiment of the disclosure. The array substrate includes a base substrate, a reflective pixel electrodes array on the base substrate, and an auxiliary reflector at least comprising a plurality of first reflective strip element, each first reflective strip element being located between two adjacent reflective pixel electrodes.

In some embodiments, the auxiliary reflector further includes a plurality of second reflective strip elements, and each second reflective strip element is arranged at a peripheral area of the reflective pixel electrodes array.

In some embodiments, the auxiliary reflector is insulated from the reflective pixel electrodes.

In some embodiments, adjacent first reflective strip elements are electrically connected with each other, and adjacent second reflective strip elements are electrically connected with each other, thereby forming a grid structure.

In some embodiments, adjacent first reflective strip elements are insulated from each other, and adjacent second reflective strip elements are insulated from each other.

In some embodiments, adjacent first reflective strip elements are disconnected from each other, and adjacent second reflective strip elements are disconnected from each other.

In some embodiments, a distance between any of the first reflective strip elements and an reflective pixel electrode adjacent thereto is greater than 1 µm, and a distance between any of the second reflective strip elements and an reflective pixel electrode adjacent thereto is greater than 1 µm.

In some embodiments, the reflective pixel electrodes and the auxiliary reflector are fabricated from a same material. For example, the reflective pixel electrodes and the auxiliary reflector are fabricated during a same patterning process to simplify the fabrication process. For example, one mask with the pattern of the reflective pixel electrodes and the pattern of the auxiliary reflector can be used to perform a photolithographic process, so as to obtain the reflective pixel electrodes and the auxiliary reflector.

In some embodiments, the material for the reflective pixel electrodes and the auxiliary reflector includes aluminum, silver, gold or molybdenum-aluminum alloy.

According to another aspect, a reflective liquid crystal display is provided by an embodiment of the disclosure. The reflective liquid crystal display includes the array substrate as described in any of the above embodiments, an opposite substrate opposite to the array substrate, and a liquid crystal layer between the array substrate and the opposite substrate.

In some embodiments, the opposite substrate includes color filters.

According to yet another aspect, a manufacturing method of the array substrate according to any of the above embodiments is provided. The method includes: providing a base substrate, and forming a reflective pixel electrodes array and an auxiliary reflector on the base substrate, the auxiliary reflector at least including a plurality of first reflective strip elements, each first reflective strip element being located between two adjacent reflective pixel electrodes.

In some embodiments, the auxiliary reflector further includes a plurality of second reflective strip elements, and each second reflective strip element is arranged at a peripheral area of the reflective pixel electrodes array.

In some embodiments, adjacent first reflective strip elements are electrically connected with each other, and adjacent second reflective strip elements are electrically connected with each other, thereby forming a grid structure.

In some embodiments, adjacent first reflective strip elements are insulated from each other, and adjacent second reflective strip elements are insulated from each other.

In some embodiments, adjacent first reflective strip elements are disconnected from each other, and adjacent second reflective strip elements are disconnected from each other.

In some embodiments, the step of forming a reflective pixel electrodes array and an auxiliary reflector on the base substrate includes: fabricating the reflective pixel electrodes and the auxiliary reflector with a patterning process using only one mask.

In some embodiments, the reflective pixel electrodes and the auxiliary reflector are fabricated with a same patterning process, which may simplify the fabrication process. For example, one mask with the pattern of the reflective pixel electrodes and the pattern of the auxiliary reflector can be used to perform a photolithographic process, so as to obtain the reflective pixel electrodes and the auxiliary reflector.

DETAILED DESCRIPTION OF EMBODIMENTS

In the following, technical solutions of the embodiments of the disclosure will be described clearly and fully in connection with the drawings. The embodiments described are some of possible embodiments of the invention, rather than all of them. Other embodiments obtained by those skilled in the art based on these described embodiments without creative efforts belong to the scope of the application.

Figure 1:
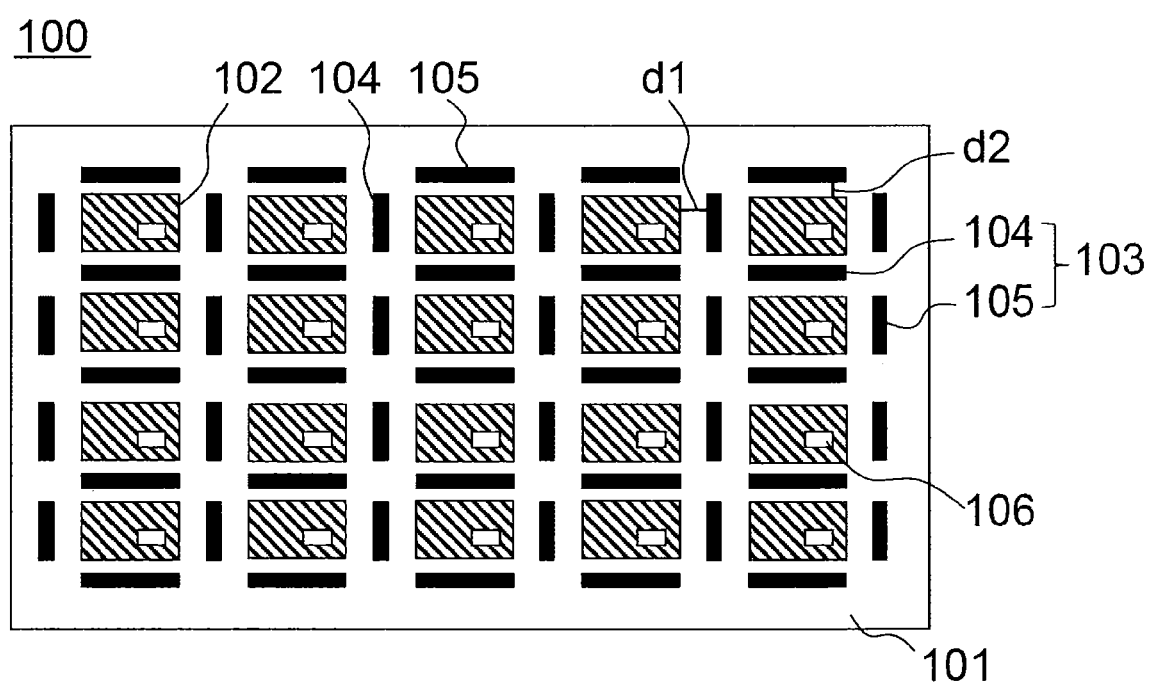
FIG. 1 is a schematic view of an array substrate according to an embodiment of the disclosure.
Figure 2:
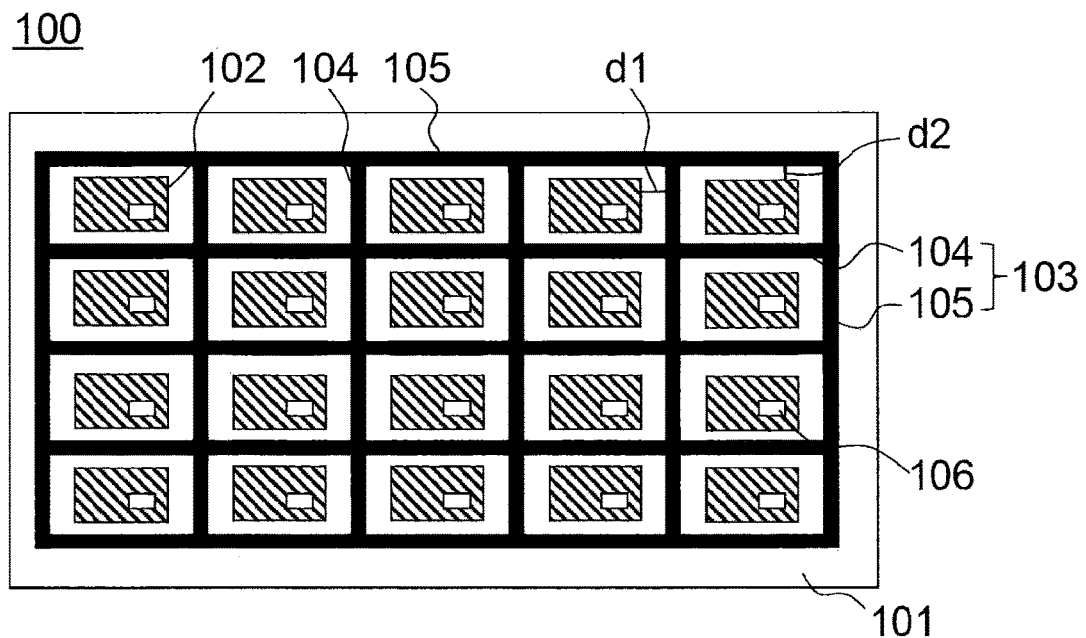
FIG. 2 is a schematic view of an array substrate according to another embodiment of the disclosure.

According to an aspect of the disclosure, as shown in FIGS. 1 and 2, an array substrate 100 is provided by an embodiment of the disclosure. The array substrate 100 includes a base substrate 101, a reflective pixel electrodes 102 array on the base substrate 101, and an auxiliary reflector 103. The auxiliary reflector 103 at least includes a plurality of first reflective strip elements 104, each first reflective strip element 104 is located between two adjacent reflective pixel electrodes 102.

In this embodiment, with the first reflective strip elements 104 arranged between adjacent reflective pixel electrodes 102, light incident to an area between the reflective pixel electrodes 102 can be sufficiently utilized. Therefore, the overall reflectance of the reflective liquid crystal display is enhanced, which can improve the display contrast and quality of image displayed. In particular, for pixels in a normally black reflective liquid crystal display, such an arrangement may enhance the reflectance (i.e., brightness) of the reflective liquid crystal display in a white mode, while the display effect in the black mode will not be affected, so the display contrast and quality of image displayed can be significantly improved. Likewise, for pixels in a normally white reflective liquid crystal display, such an arrangement can enhance the reflectance of the reflective liquid crystal display in a white mode, accordingly, the display contrast and quality of image displayed can be significantly improved.

A person of ordinary skill in the art can understand that, the array substrate may further include conventional components for achieving display, e.g., a thin film transistor 106, a gate line, and a data line. The thin film transistor 106 may be replaced with other switching elements. These conventional components will not be described in detail herein.

Optionally, as shown in FIGS. 1 and 2, the auxiliary reflector 103 further includes a plurality of second reflective strip elements 105, each second reflective strip element 105 is arranged at a peripheral area of the reflective pixel electrodes 102 array.

In some embodiments, with the second reflective strip elements 105 at the peripheral area of the reflective pixel electrodes 102 array, more light can be reflected toward the display area, which further increases the overall reflectance of the reflective liquid crystal display, thereby improving the display contrast and quality of image displayed.

Optionally, as shown in FIGS. 1 and 2, the auxiliary reflector 103 is insulated from the reflective pixel electrodes 102.

In some embodiments, the auxiliary reflector 103 is insulated from the reflective pixel electrodes 102, with such an arrangement, the auxiliary reflector 103 is not electrically connected with the pixel electrodes 102 or switching elements 106 in the pixels. Hence, each pixel can be independently controlled, and the influence to display quality by the auxiliary reflector 103 can be eliminated.

Optionally, as shown in FIG. 2, adjacent first reflective strip elements 104 are electrically connected with each other, and adjacent second reflective strip elements 105 are electrically connected with each other, thereby forming a grid structure.

In some embodiments, the plurality of first reflective strip elements 104 and the plurality of second reflective strip elements 105 form a grid structure. Such a grid structure is advantageous to electrostatic protection, for example, the grid structure may be grounded to eliminate static electricity accumulated in the liquid crystal display.

Optionally, as shown in FIG. 1, adjacent first reflective strip elements 104 are insulated from each other, and adjacent second reflective strip elements 105 are insulated from each other.

In some embodiments, adjacent first reflective strip elements 104 are disconnected from each other, and adjacent second reflective strip elements 105 are disconnected from each other. For a liquid crystal display having a relatively high refresh rate, such an arrangement is favorable to reduce parasitic capacitance that would affect the quality of image displayed.

Optionally, as shown in FIGS. 1 and 2, a distance d1 between a first reflective strip element 104 and an adjacent reflective pixel electrode 102 is greater than 1 μm, and a distance d2 between a second reflective strip element 105 and an adjacent reflective pixel electrode 102 is greater than 1 μm.

In some embodiments, the distance between the first/second reflective strip element and an adjacent reflective pixel electrode is greater than 1 μm, which would further reduce the parasitic capacitance and effectively avoid defects (e.g., short circuit) occurring in the manufacture process.

Optionally, the reflective pixel electrodes 102 and the auxiliary reflector 103 are fabricated from a same material.

In some embodiments, the reflective pixel electrodes 102 and the auxiliary reflector 103 are fabricated from a same material. For example, the reflective pixel electrodes 102 and the auxiliary reflector 103 are fabricated during a same patterning process to simplify the fabrication process. For example, one mask with the pattern of the reflective pixel electrodes and the pattern of the auxiliary reflector can be used to perform a photolithographic process, so as to obtain the reflective pixel electrodes and the auxiliary reflector.

Optionally, the material for the reflective pixel electrodes and the auxiliary reflector includes aluminum, silver, gold or molybdenum-aluminum alloy.

In some embodiments, the reflective pixel electrodes and the auxiliary reflector are fabricated from aluminum, silver, gold or molybdenum-aluminum alloy, which further increase the overall reflectance of the reflective liquid crystal display.

Figure 3:
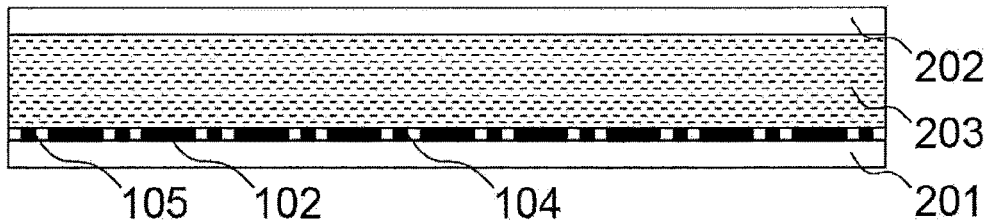
FIG. 3 is a schematic view of a reflective liquid crystal display according to an embodiment of the disclosure.

According to another aspect of the disclosure, as shown in FIG. 3, a reflective liquid crystal display 200 is provided by an embodiment of the disclosure. The reflective liquid crystal display 200 includes the array substrate 201 as described in the above embodiments, an opposite substrate 202 opposite to the array substrate 201, and a liquid crystal layer 203 between the array substrate 201 and the opposite substrate.

In some embodiments, by means of the first reflective strip elements between adjacent reflective pixel electrodes, light incident on the area between the adjacent reflective pixel electrodes is sufficiently utilized, hence, the overall reflectance of the reflective liquid crystal display is enhanced, and the display contrast and quality of image displayed are improved. In particular, for pixels in a normally black reflective liquid crystal display, such an arrangement may enhance the reflectance (i.e., brightness) of the reflective liquid crystal display in a white mode, while the display effect in the black mode will not be affected, so the display contrast and quality of image displayed can be significantly improved. Likewise, for pixels in a normally white reflective liquid crystal display, such an arrangement can enhance the reflectance of the reflective liquid crystal display in a white mode, accordingly, the display contrast and quality of image displayed can be significantly improved.

Figure 4:
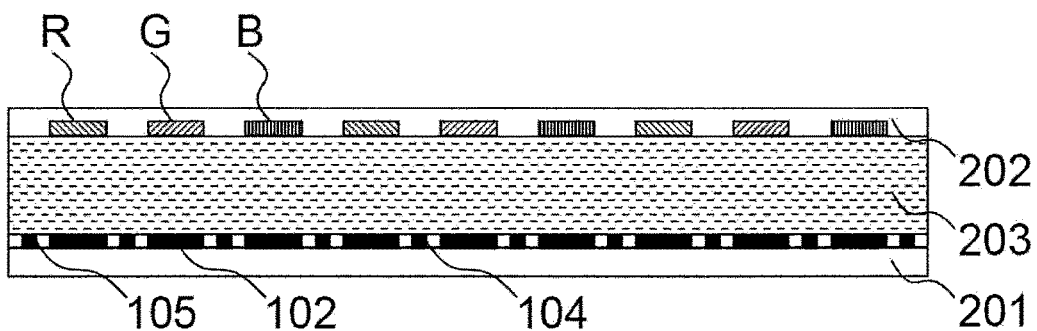
FIG. 4 is a schematic view of a reflective liquid crystal display according to another embodiment of the disclosure.

Optionally, the opposite substrate 202 includes color filters R, G and B, as shown in FIG. 4.

In some embodiments, the reflective liquid crystal display can achieve color display with the color filters arranged on the opposite substrate.

Figure 5:
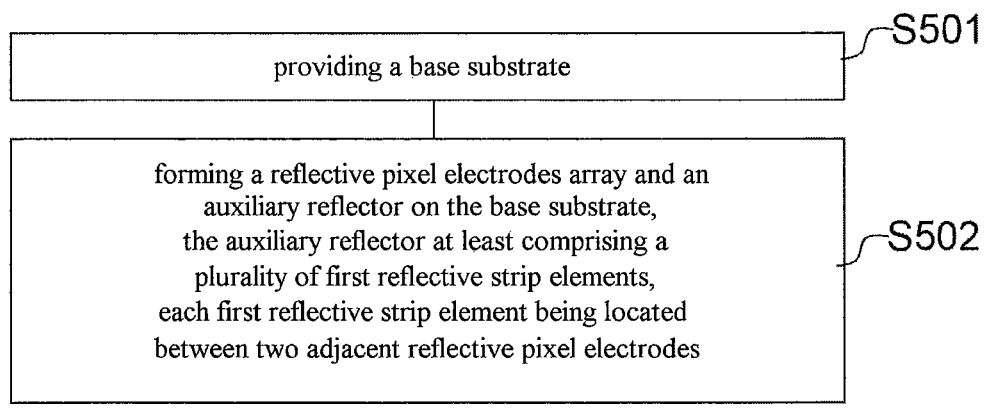
FIG. 5 is a flow chart of a manufacturing method of an array substrate according to an embodiment of the disclosure.

According to yet another aspect, as shown in FIG. 5, a manufacturing method of the array substrate according to any of the above embodiments is provided. The method 500 includes: S501, providing a base substrate, and S502, forming a reflective pixel electrodes array and an auxiliary reflector on the base substrate, the auxiliary reflector at least comprising a plurality of first reflective strip elements, each first reflective strip element being located between two adjacent reflective pixel electrodes.

In this embodiment, by means of the first reflective strip elements arranged between adjacent reflective pixel electrodes, light incident to an area between the reflective pixel electrodes can be sufficiently utilized. Therefore, the overall reflectance of the reflective liquid crystal display is enhanced, which will improve the display contrast and quality of image displayed. In particular, for pixels in a normally black reflective liquid crystal display, such an arrangement may enhance the reflectance (i.e., brightness) of the reflective liquid crystal display in a white mode, while the display effect in the black mode will not be affected, so the display contrast and quality of image displayed can be significantly improved. Likewise, for pixels in a normally white reflective liquid crystal display, such an arrangement can enhance the reflectance of the reflective liquid crystal display in a white mode, accordingly, the display contrast and quality of image displayed can be significantly improved.

Optionally, the auxiliary reflector further includes a plurality of second reflective strip elements, and each second reflective strip element is arranged at a peripheral area of the reflective pixel electrodes array.

In some embodiments, with the second reflective strip elements at the peripheral area of the reflective pixel electrodes array, more light can be reflected toward the display area, which further increases the overall reflectance of the reflective liquid crystal display, thereby improving the display contrast and quality of image displayed.

Optionally, adjacent first reflective strip elements are electrically connected with each other, and adjacent second reflective strip elements are electrically connected with each other, thereby forming a grid structure.

In some embodiments, the plurality of first reflective strip elements and the plurality of second reflective strip elements form a grid structure. Such a grid structure is advantageous to electrostatic protection, for example, the grid structure may be grounded to eliminate static electricity accumulated in the liquid crystal display.

Optionally, adjacent first reflective strip elements are insulated from each other, and adjacent second reflective strip elements are insulated from each other.

In some embodiments, adjacent first reflective strip elements are disconnected from each other, and adjacent second reflective strip elements are disconnected from each other. For a liquid crystal display having a relatively high refresh rate, such an arrangement is favorable to reduce parasitic capacitance that would affect the quality of image displayed.

Optionally, the step of forming a reflective pixel electrodes array and an auxiliary reflector on the base substrate includes: fabricating the reflective pixel electrodes and the auxiliary reflector with a patterning process using only one mask.

In some embodiments, the reflective pixel electrodes and the auxiliary reflector are fabricated with a same patterning process, which may simplify the fabrication process. For example, one mask with the pattern of the reflective pixel electrodes and the pattern of the auxiliary reflector can be used to perform a photolithographic process, so as to obtain the reflective pixel electrodes and the auxiliary reflector.

In the following, an example will be presented to illustrate a manufacturing method of the reflective liquid crystal display, so as to provide more details to the embodiments herein.

Referring to FIG. 4, the reflective liquid crystal display 200 includes the array substrate 201 as described in the above embodiments, an opposite substrate 202 opposite to the array substrate 201, and a liquid crystal layer 203 between the array substrate 201 and the opposite substrate 202.

The manufacturing method of the reflective liquid crystal display includes the following steps.

a: forming a gate layer, a gate insulation layer, an active layer, a source/drain layer and a resin layer in sequence on the base substrate.

b: forming patterns of the pixel electrodes and the auxiliary reflector on the base substrate for which the above step a has been performed, thereby forming an array substrate. A width of the first/second reflective strip element is 6 μm, a distance between the first/second reflective strip element and an adjacent pixel electrode is 1.5 μm.

c: coating a black matrix, color resin layer and an ITO layer serving as e.g. a common electrode in sequence on a color film substrate. Optionally, the color of the color resin layer may include RGB, RGBW, etc. Optionally, the color resin layer is not provided, thereby achieving black and white display.

d: fabricating a spacer on the color film substrate for which the above step c is performed.

e: coating sealant to the color film substrate for which the above step d is performed.

f: injecting liquid crystal drops onto the array substrate for which the above step b is performed.

g: performing alignment process for the array substrate with the liquid crystals and the color film substrate coated with sealant, so as to obtain a reflective liquid crystal display.

For the array substrate, the reflective liquid crystal display, and the manufacturing method of the array substrate provided according to the embodiments of the disclosure, with the first reflective strip elements arranged between adjacent reflective pixel electrodes, light incident to an area between the reflective pixel electrodes can be sufficiently utilized. Therefore, the overall reflectance of the reflective liquid crystal display is enhanced, which can improve the display contrast and quality of image displayed. In particular, for pixels in a normally black reflective liquid crystal display, such an arrangement can enhance the reflectance (i.e., brightness) of the reflective liquid crystal display in a white mode, while the display effect in a black mode will not be affected, so the display contrast and quality of image displayed can be significantly improved. Likewise, for pixels in a normally white reflective liquid crystal display, such an arrangement can enhance the reflectance of the reflective liquid crystal display in a white mode, so the display contrast and quality of image displayed can also be significantly improved.

Apparently, the person of ordinary skill in the art can make various modifications and variations to the embodiments of the disclosure without departing the spirit and scope of the invention. As such, provided that these modifications and variations pertain to the scope of the claims appended and their equivalents, the invention is intended to encompass these modifications and variations.

The invention claimed is:

1. An array substrate, comprising:
    a base substrate,
    a reflective pixel electrodes array comprising reflective pixel electrodes on the base substrate, and
    an auxiliary reflector comprising a plurality of first reflective strip elements,
    wherein ones of the first reflective strip elements are between adjacent ones of the reflective pixel electrodes,
    wherein the auxiliary reflector further comprises a plurality of second reflective strip elements, wherein ones of the second reflective strip elements are in a peripheral area of the reflective pixel electrodes array,
    wherein the plurality of first reflective strip elements, the plurality of second reflective strip elements and the reflective pixel electrodes are in a same layer,
    wherein the auxiliary reflector is insulated from the reflective pixel electrodes.

2. The array substrate according to claim 1,
    wherein adjacent ones of the first reflective strip elements are electrically connected with each other, and
    wherein adjacent ones of the second reflective strip elements are electrically connected with each other, thereby forming a grid structure.

3. The array substrate according to claim 1,
    wherein adjacent ones of the first reflective strip elements are insulated from each other, and
    wherein adjacent ones of the second reflective strip elements are insulated from each other.

4. The array substrate according to claim 1,
    wherein a distance between ones of the first reflective strip elements and a reflective pixel electrode of the reflective pixel electrodes array adjacent thereto is greater than 1 μm, and
    wherein a distance between ones of the second reflective strip elements and a reflective pixel electrode of the reflective pixel electrodes array adjacent thereto is greater than 1 μm.

5. The array substrate according to claim 1, wherein the reflective pixel electrodes of the reflective pixel electrodes array and the auxiliary reflector are fabricated from a same material.

6. The array substrate according to claim 1, wherein a material for the reflective pixel electrodes or the auxiliary reflector comprises aluminum, silver, gold, or molybdenum-aluminum alloy.

7. A reflective liquid crystal display, comprising:
    the array substrate according to claim 1,
    an opposite substrate that is opposite to the array substrate, and
    a liquid crystal layer between the array substrate and the opposite substrate.

8. The reflective liquid crystal display according to claim 7, wherein the opposite substrate comprises color filters.

9. The reflective liquid crystal display according to claim 7,
    wherein adjacent ones of the first reflective strip elements are electrically connected with each other, and
    wherein adjacent ones of the second reflective strip elements are electrically connected with each other, thereby forming a grid structure.

10. The reflective liquid crystal display according to claim 7,
    wherein adjacent ones of the first reflective strip elements are insulated from each other, and
    wherein adjacent ones of the second reflective strip elements are insulated from each other.

11. The reflective liquid crystal display according to claim 7,
    wherein a distance between ones of the first reflective strip elements and adjacent ones of the reflective pixel electrodes is greater than 1 μm, and
    wherein a distance between ones of the second reflective strip elements and adjacent ones of the reflective pixel electrodes is greater than 1 μm.

12. A manufacturing method for an array substrate, the manufacturing method comprising:
    providing a base substrate, and
    forming a reflective pixel electrodes array and an auxiliary reflector on the base substrate,
    wherein the auxiliary reflector comprises a plurality of first reflective strip elements, and
    wherein ones of the first reflective strip elements are between adjacent reflective pixel electrodes of the reflective pixel electrodes array,
    wherein the auxiliary reflector further comprises a plurality of second reflective strip elements, wherein ones of the second reflective strip elements are in a peripheral area of the reflective pixel electrodes array,
    wherein the plurality of first reflective strip elements, the plurality of second reflective strip elements and the reflective pixel electrodes are in a same layer,
    wherein the auxiliary reflector is insulated from the reflective pixel electrodes of the reflective pixel electrodes array.

13. The manufacturing method according to claim 12,
wherein adjacent ones of the first reflective strip elements are electrically connected with each other, and
wherein adjacent ones of the second reflective strip elements are electrically connected with each other, thereby forming a grid structure.

14. The manufacturing method according to claim 12,
wherein adjacent ones of the first reflective strip elements are insulated from each other, and
wherein adjacent ones of the second reflective strip elements are insulated from each other.

15. The manufacturing method according to claim 12, wherein the forming the reflective pixel electrodes array and the auxiliary reflector on the base substrate comprises:
fabricating the reflective pixel electrodes of the reflective pixel electrodes array and the auxiliary reflector with a patterning process using only one mask.

\* \* \* \* \*